(12) United States Patent
Spencer et al.

(10) Patent No.: US 7,857,294 B2
(45) Date of Patent: Dec. 28, 2010

(54) COMPOSITE SPRINGS AND METHODS OF MANUFACTURE

(75) Inventors: Brian E Spencer, Sacramento, CA (US); Zachary B Spencer, Sacramento, CA (US)

(73) Assignee: Spencer Composites Corporation, Sacramento, CA (US)

(*) Notice: Subject to any disclaimer, the term of this patent is extended or adjusted under 35 U.S.C. 154(b) by 0 days.

(21) Appl. No.: 12/409,817

(22) Filed: Mar. 24, 2009

(65) Prior Publication Data

US 2009/0243174 A1 Oct. 1, 2009

Related U.S. Application Data

(60) Provisional application No. 61/040,246, filed on Mar. 28, 2008.

(51) Int. Cl.
*F16F 1/04* (2006.01)
(52) U.S. Cl. ........................................ 267/148; 267/166
(58) Field of Classification Search .................. 267/148, 267/149, 166, 180
See application file for complete search history.

(56) References Cited

U.S. PATENT DOCUMENTS

| | | | |
|---|---|---|---|
| 4,260,143 A | 4/1981 | Kliger | |
| 4,434,121 A | 2/1984 | Schaper | |
| 4,473,217 A | 9/1984 | Hashimoto | |
| 4,991,827 A * | 2/1991 | Taylor | 267/149 |
| 5,603,490 A | 2/1997 | Folsom | |
| 5,988,612 A | 11/1999 | Bertelson | |
| 6,193,225 B1 * | 2/2001 | Watanabe | 267/180 |
| 6,986,203 B2 | 1/2006 | Chiu | |
| 7,311,124 B2 * | 12/2007 | Sardou | 140/71 C |
| 2002/0190451 A1 | 12/2002 | Sancaktar et al. | |
| 2004/0195744 A1 * | 10/2004 | Sancaktar et al. | 267/166 |

* cited by examiner

*Primary Examiner*—Christopher P Schwartz
(74) *Attorney, Agent, or Firm*—Davidson Berquist Jackson & Gowdey, LLP

(57) ABSTRACT

Composite springs and methods of manufacture are described. The composite springs include a flexible core supporting multiple layers of a cured, resin-impregnated composite fiber wherein resin-impregnated composite fiber is wound or braided over the flexible core and cured on a helical mold to form a spring having a desired helical pitch, diameter and spring rate. The multiple layers of resin-impregnated composite fiber are wound or braided at ±5-90 degrees relative to the longitudinal axis of the flexible core.

15 Claims, 3 Drawing Sheets

COMPOSITE SPRINGS AND METHODS OF MANUFACTURE

RELATED APPLICATIONS

This application claims benefit under 35 USC §119(e) from U.S. Provisional Application No. 61/040,246, filed Mar. 28, 2008, the entire contents of which are incorporated herein for all purposes.

FIELD OF THE INVENTION

Composite springs and methods of manufacture are described.

BACKGROUND OF THE INVENTION

It is well known that springs can be manufactured from a variety of materials including metals and plastics.

The properties of springs are wide-ranged and are characterized by parameters including configuration, diameter, length, helical angle or pitch, diameter and materials. These factors and others will establish the performance of a particular spring design.

For example, one key parameter of a spring is its rate. The rate of a spring is the change in the force it exerts, divided by the change in deflection of the spring. That is, the rate of a spring is the gradient of the force versus deflection curve. For an extension or compression spring, this will normally be expressed in lbf/in or N/m. The inverse of spring rate is compliance which is the inverse of rate. That is, if a spring has a rate of 10 N/mm, it has a compliance of 0.1 mm/N. The stiffness (or rate) of springs in parallel is additive, as is the compliance of springs in series.

Ideally, any spring will have a highly repeatable and reliable performance over many cycles to ensure consistent performance in its application. For example, in certain applications a spring may be termed "successful" if 100,000 maximum stroke cycles are demonstrated without failure. In other applications, other parameters such as lower weight and increased dampening may be desirable in addition to reliability.

In the specific case of the automotive industry, currently utilized metal springs are limited in certain applications by properties such as weight and spring dampening. For example, in a high performance application such as a race car, there is a need for the lowest weight solution for each component on the race car.

Further still, in an automobile engine, valve springs can limit the engine maximum speed by their natural frequency. That is, once the valve spring reaches its natural frequency due to the speed of the engine, the valve "floats" which prevents the proper motion of the valve thereby resulting in inefficient use of fuel into the engine combustion chamber and/or exhaust gases expulsion.

Further still, steel springs are subject to other disadvantages such as corrosion and electrical and thermal conductivity thus making them unsuitable for particular applications.

As a result, there has been a need for improved springs in which weight, performance and other properties are improved while otherwise maintaining similar properties to existing metal springs.

SUMMARY OF THE INVENTION

In accordance with the invention there is provided a composite spring comprising a flexible core supporting multiple layers of a cured resin-impregnated composite fiber, the flexible core and cured resin-impregnated composite fiber wound or braided to form a spring having a desired helical pitch, diameter and spring rate.

In further embodiments, the multiple layers of cured resin-impregnated composite fiber are wound or braided at ±5-90 degrees relative to the longitudinal axis of the flexible core.

In a further embodiment, the invention provides a method of manufacturing a composite spring comprising the steps of:
  a. winding resin-impregnated composite fiber over a flexible core to create a wet fiber cord;
  b. wrapping the wet fiber cord on a spring mold and allowing the wet fiber cord to cure to form a cured fiber spring; and,
  c. removing the cured fiber spring from the spring mold.

BRIEF DESCRIPTION OF THE DRAWINGS

The invention is described with reference to the drawings where.

DETAILED DESCRIPTION

In accordance with the invention and with reference to the figures, composite springs and methods of manufacture are described.

Composite springs as shown in FIGS. 1A-1D are prepared in accordance with the following general methodology:
  a. resin-impregnated composite fiber 50 is wound over a straight metal or plastic core 52 to create a wet fiber cord;
  b. the wet fiber cord is wrapped on a spring mold 10 and allowed to cure;
  c. the cured composite is removed from the spring mold as a composite spring 60; and,
  d. the composite spring is cut to length and/or subjected to other post-curing steps.

More specifically, in step a, the resin-impregnated fiber 50 is wrapped over the metal or plastic core 52 in a series of layers at various wind angles in order to build up the wet fiber cord to a desired thickness. Preferably, the metal or plastic core has a small diameter relative to the desired thickness and serves primarily as a mandrel to ensure that the initial layers of fiber are laid down evenly and consistently particularly if wound fibers are utilized. In this case, the ratio of the core to the resin-impregnated fiber could range from approximately 0.0001 to 0.9999. The metal or plastic core must be sufficiently flexible to allow the wet-fiber cord to be wrapped around the spring mold without breaking and thereby prevent creating any internal distortions or imperfections in the continuity of the cured spring.

During winding, the metal or plastic core is rotated at a desired rate and fiber is pulled from spools and impregnated with resin as the spools travel linearly at a desired rate with respect to the longitudinal axis of the metal or plastic core so as to allow each layer of the resin-impregnated composite fiber to be laid down in accordance with desired angles. The fiber angles may be varied from approximately ±5-90 degrees as desired. Multiple layers and layers of composites of different moduli may be utilized in different springs or within the same spring.

In an alternate embodiment, the resin-impregnated fiber may be braided (which may eliminate the need for a metal or plastic core) or may be a combination of braided and wound fiber.

After the desired structure has been created, the wet fiber cord is removed and wound around the spring mold 10.

Figure 1:
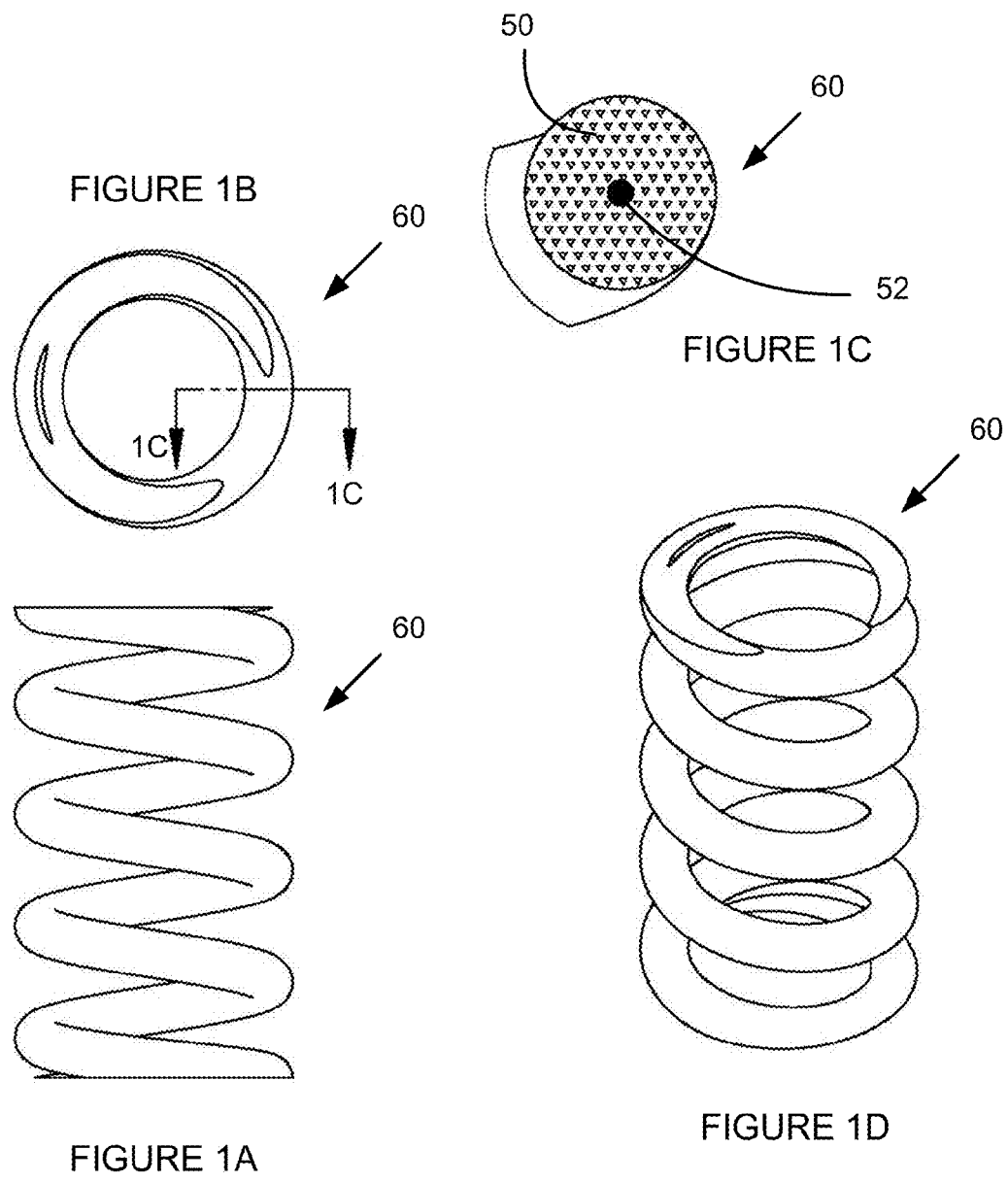
FIGS. 1A, 1B, 1C, and 1D are side, top, cross-sectional and perspective views respectively of a composite spring in accordance with one embodiment of the invention.
Figure 2:
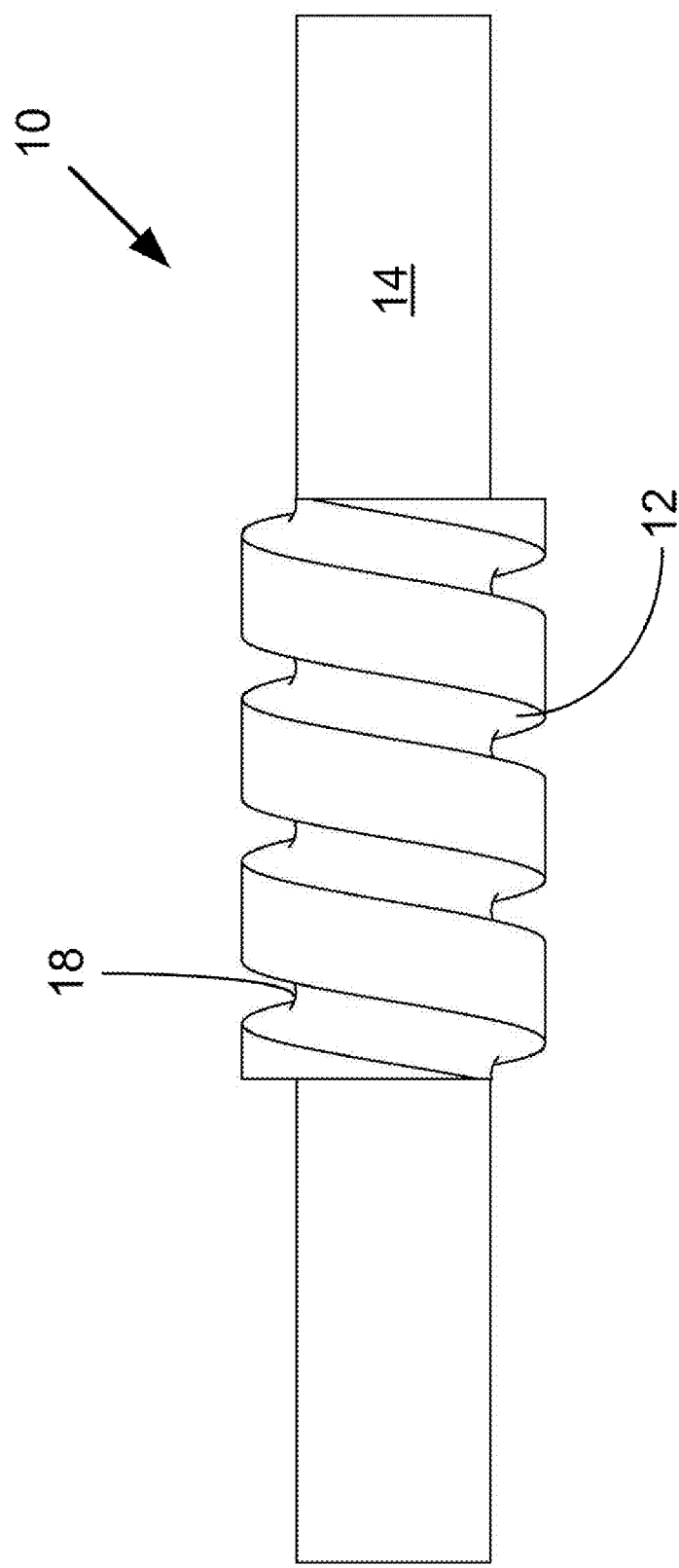
FIG. 2 is a sketch of a spring mold in accordance with one embodiment of the invention; and, FIG. 3 is a graph showing the spring rate of a composite spring in accordance with one embodiment of the invention.

The spring mold 10 has a structure similar to that of a worm gear as shown in FIG. 2. That is, the spring mold has a helical groove 12 around a cylindrical body 14 for supporting the wet fiber cord within the groove at a specific helical diameter and angle. Ideally, the spring mold has an inner groove curvature 18 so as to fully support the wet fiber cord within the groove. For most applications, the groove will have a semi-circular curvature that will support a round cross section of the cured spring. The dimensions of the helical groove (including the pitch, diameter and groove curvature) may also vary along the length of the spring mold.

After winding the resin-impregnated fiber cord on the spring mold, the resin is cured at an appropriate temperature (preferably in a temperature controlled oven) to form a cured spring. After curing, the mold is removed by "unscrewing" the mold from the cured spring. The spring is cut to a desired size and subjected to any final treatment steps as may be desired such as machining to a different profile, grinding or polishing. The core may also be removed.

Spring Design

A composite spring is generally designed to match the physical dimensions of a corresponding steel spring if the composite spring is intended to replace the steel spring. In this case, the steel spring dimensions and rate would be determined in order to initiate the design of a corresponding composite spring.

After determining the desired properties of the composite spring, the fiber band angle or angles around the wire or plastic core together with the fiber modulus are determined as the most significant parameters that will determine the final rate of the spring together with the helix pitch and composite core diameter. For example, changing the fiber angle above or below 45 degrees will increase or reduce the final spring rate.

As a result, changing or varying the winding angle allows significant variability in the spring properties for a final geometry.

In addition, the following modifications may be made to the process to incorporate desired properties:

a. the fiber angle can be changed along the length of the spring to tailor the final properties and/or to provide different properties along the length of the spring including torsional and bending strength.

b. the wet fiber cord may be laid down using a braiding process;

c. the spring may have a non-circular cross-section;

d. the spring may utilize different composite fibers in different layers.

Applications

Composite springs produced in accordance with the invention have a higher natural frequency than steel springs and thereby can allow higher cycle frequencies. For example in the case of an automotive application, the higher natural frequency may enable higher engine speeds.

Composite springs may also be used in other applications such as within an automobile suspension thereby contributing to a weight reduction.

Materials

As composites are a combination of materials, many options in the selection of materials to produce a spring having a desired spring performance.

For engine and automotive suspension applications, the most appropriate material will likely be carbon fiber particularly for applications where a stiffer spring is required. Specifically, as carbon fiber is available with different stiffnesses, the control of a spring's stiffness can be achieved by varying the carbon fiber starting material and/or wind angles.

Fiberglass can also be used to fabricate springs, but is generally heavier than carbon fiber and is lower in stiffness. Fiberglass springs could be used in commercial applications such as chairs.

Further still, other fibrous materials including aramid fibers (eg. Kevlar™ or Zylon™), plastic or metal fibers within a resin matrix may be utilized.

Testing

Composite springs in accordance with the invention have been demonstrated to meet the geometric contraints of existing steel springs while matching spring rates and improving upon the weight and other parameters of a corresponding steel spring.

Figure 3:
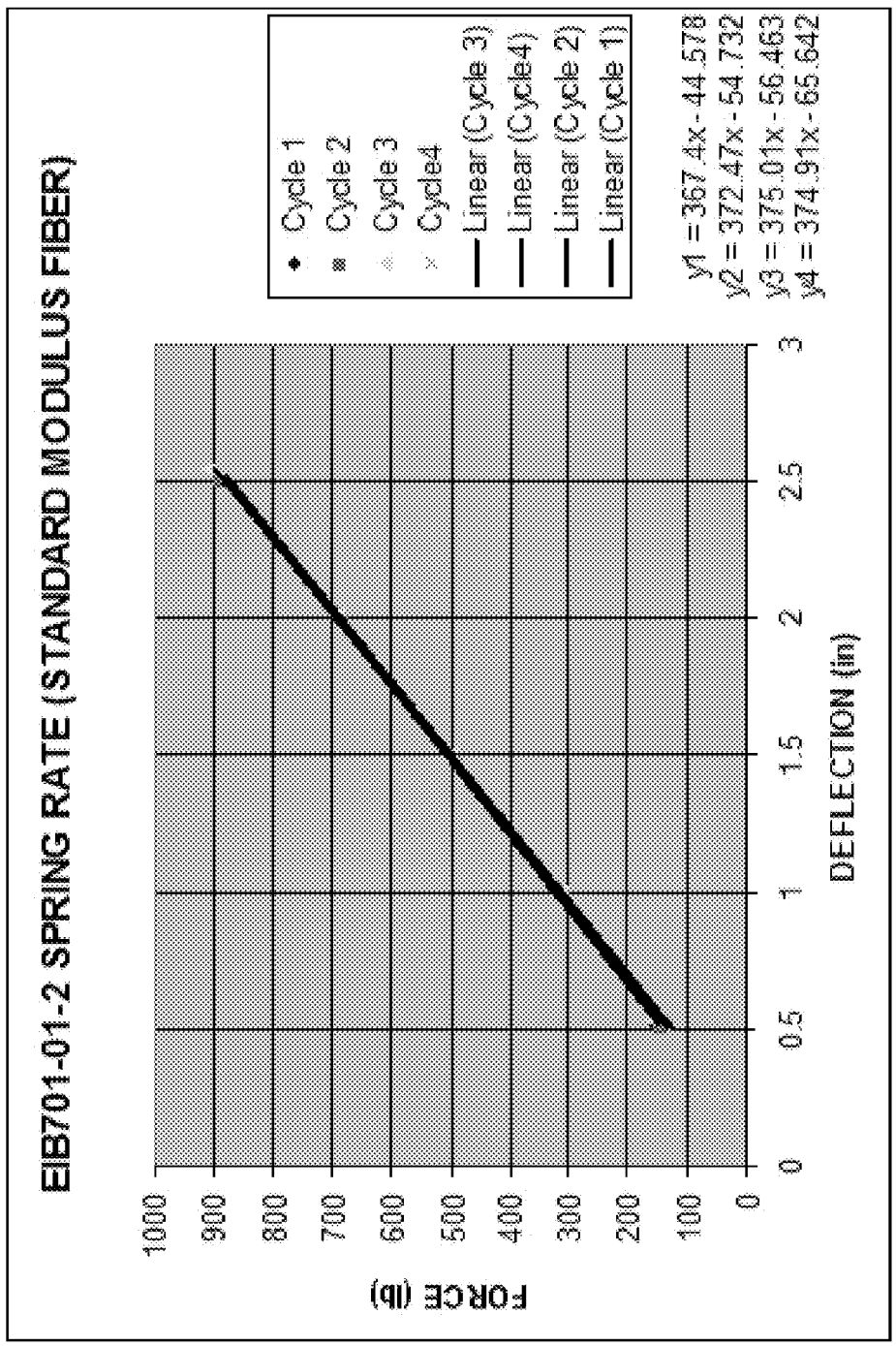

As shown in FIG. 3, the performance of a composite 34 msi modulus carbon fiber spring having a rate of approximately 375 pounds/inch is shown. In this case, the spring deflection (inches) is measured with increasing force (pounds) and the graph shows that as force is increased, the deflection increases linearly. The graph also shows that the results are highly repeatable based on 4 cycles. This composite spring was 50% lighter than the corresponding steel spring.

The invention claimed is:

1. A composite spring comprising:

a core; and multiple layers of a cured resin-impregnated composite fiber wound around the core, wherein the core and the multiple layers of cured resin-impregnated composite fiber form a spring having a desired helical pitch, diameter and spring rate; and wherein the multiple layers of cured resin-impregnated composite fiber are formed on the core by (a) rotating a straight form of the core at a desired rate and wherein fiber is pulled from spools and impregnated with resin as the spools travel linearly at a desired rate with respect to the longitudinal axis of the straight form of the core so as to allow each layer of the resin-impregnated composite fiber to be laid down in accordance with desired angles, and (b) the straight form of the core with resin-impregnated composite fiber is wrapped on a spring form and allowed to cure, and (c) the spring form is removed from the cured resin-impregnated composite fiber.

2. A composite spring as in claim 1 wherein the multiple layers of cured resin-impregnated composite fiber are wound around the core at an angle between 5 and 90 degrees relative to the longitudinal axis of the core.

3. A composite spring as in claim 2 wherein different layers of the cured resin-impregnated composite fiber are wound at different angles.

4. A composite spring as in claim 2 wherein the composite spring has a circular cross-section.

5. A composite spring as in claim 2 wherein the composite spring has a non-circular cross-section.

6. A composite spring as in claim 2 wherein the angle of the wound composite fiber is varied along the length of the spring to form a spring with different spring properties along the length of the spring.

7. A composite spring as in claim 6 wherein the spring properties include torsional strength and bending strength.

8. A composite spring as in claim 1 wherein the thickness ratio of the core to the multiple layers of the cured resin-impregnated composite fiber is between 0.0001 and 0.9999.

9. A composite spring as in claim 8 wherein the thickness ratio of the core to the multiple layers of the cured resin-impregnated composite fiber is between 0.0001 and 0.3.

10. A composite spring as in claim 1 wherein the cured resin-impregnated composite fiber is carbon fiber.

11. A composite spring as in claim 1 wherein the core is removed after curing.

12. A composite spring as in claim 1 wherein different layers of the cured resin-impregnated composite fiber are composed of different composite materials.

13. A method of manufacturing a composite spring comprising the steps of:
   a. winding resin-impregnated composite fiber over a core to create a wet fiber cord;
   b. wrapping the wet fiber cord on a spring mold and allowing the wet fiber cord to cure to form a cured fiber spring; and
   c. removing the cured fiber spring from the spring mold,
   wherein multiple layers of cured resin-impregnated composite fiber are wound on the core by rotating a straight form of the core at a desired rate and wherein fiber is pulled from spools and impregnated with resin as the spools travel linearly at a desired rate with respect to the longitudinal axis of the straightened form of the core so as to allow each layer of the resin-impregnated composite fiber to be laid down in accordance with desired angles.

14. A method as in claim 13 wherein the spring mold has a helical groove for supporting the wet fiber cord, the helical groove having an inner supporting surface corresponding to the desired inner cross-section of the composite spring.

15. A method as in claim 13 wherein the flexible core is removed after curing.

* * * * *